(12) United States Patent
Tebianian et al.

(10) Patent No.: US 11,000,820 B2
(45) Date of Patent: May 11, 2021

(54) DEVICE FOR DISTRIBUTING A POLYPHASE MIXTURE IN A CHAMBER CONTAINING A FLUIDIZED MEDIUM

(71) Applicant: IFP Energies Nouvelles, Rueil-Malmaison (FR)

(72) Inventors: Sina Tebianian, Rueil-Malmaison (FR); Benjamin Amblard, Rueil-Malmaison (FR); Thierry Gauthier, Rueil-Malmaison (FR)

(73) Assignee: IFP Energies Nouvelles, Rueil-Malmaison (FR)

( * ) Notice: Subject to any disclaimer, the term of this patent is extended or adjusted under 35 U.S.C. 154(b) by 0 days.

(21) Appl. No.: 16/610,669

(22) PCT Filed: Apr. 26, 2018

(86) PCT No.: PCT/EP2018/060799
§ 371 (c)(1),
(2) Date: Nov. 4, 2019

(87) PCT Pub. No.: WO2018/202554
PCT Pub. Date: Nov. 8, 2018

(65) Prior Publication Data
US 2020/0147575 A1    May 14, 2020

(30) Foreign Application Priority Data
May 5, 2017 (FR) ...................................... 1754006

(51) Int. Cl.
*B01J 8/18* (2006.01)
*C10G 47/30* (2006.01)
(Continued)

(52) U.S. Cl.
CPC ............... *B01J 8/1827* (2013.01); *B01J 8/26* (2013.01); *B01J 8/44* (2013.01); *C10G 47/30* (2013.01);
(Continued)

(58) Field of Classification Search
CPC ..... B01J 8/1827; B01J 8/26; B01J 8/44; B01J 2208/0092; B01J 2208/00929;
(Continued)

(56) References Cited

U.S. PATENT DOCUMENTS 4,787,791 A    11/1988 Lambousy et al.
5,575,086 A    11/1996 Hartman et al.
(Continued)

FOREIGN PATENT DOCUMENTS

CN    103240038 A    8/2013
CN    104923131 A    9/2015
(Continued)

OTHER PUBLICATIONS

International Search Report dated Jul. 24, 2018 issued in corresponding PCT/EP2018/060799 application (3 pages).
(Continued)

*Primary Examiner* — Huy Tram Nguyen
(74) *Attorney, Agent, or Firm* — Millen White Zelano and Branigan, PC; Csaba Henter

(57) ABSTRACT

The present invention describes a device for distributing a light phase in a heavy phase inside a reaction chamber (5) containing said heavy phase in the fluidized state, comprising a pipe (1) for conveying the light phase, said pipe (1) being cylindrical, and being open in its upper part via first and second rectangular openings (7, 8) pierced in the lateral wall of said pipe (1), the second openings (8) being extended by branches (6) perpendicular to the axis of symmetry of the
(Continued)

reaction chamber (5), and the pipe (1) being surmounted at its upper part by a convex head (9).

18 Claims, 4 Drawing Sheets

(51) Int. Cl.
  *B01J 4/00* (2006.01)
  *B01J 8/26* (2006.01)
  *B01J 8/44* (2006.01)
(52) U.S. Cl.
  CPC .............. *B01J 2208/0092* (2013.01); *B01J 2208/00929* (2013.01); *B01J 2208/00938* (2013.01)
(58) Field of Classification Search
  CPC .. B01J 2208/00938; B01J 8/004; B01J 8/085; B01J 4/002; C10G 47/30
  USPC ........................................ 422/140
  See application file for complete search history.

(56) References Cited

U.S. PATENT DOCUMENTS

| | | | |
|---|---|---|---|
| 6,221,318 B1 * | 4/2001 | Khouw | B01J 8/0015 34/369 |
| 9,833,759 B2 | 12/2017 | Le Coz et al. | |
| 2014/0360919 A1 | 12/2014 | Le Coz et al. | |

FOREIGN PATENT DOCUMENTS

| | | |
|---|---|---|
| CN | 105080438 A | 11/2015 |
| EP | 2813283 A1 | 12/2014 |
| WO | 96/08676 A1 | 3/1996 |

OTHER PUBLICATIONS

English Abstract of CN 103240038 A published Aug. 14, 2013.
English Abstract of CN 104923131 A published Sep. 23, 2015.
English Abstract of CN 105080438 A published Nov. 25, 2015.

\* cited by examiner

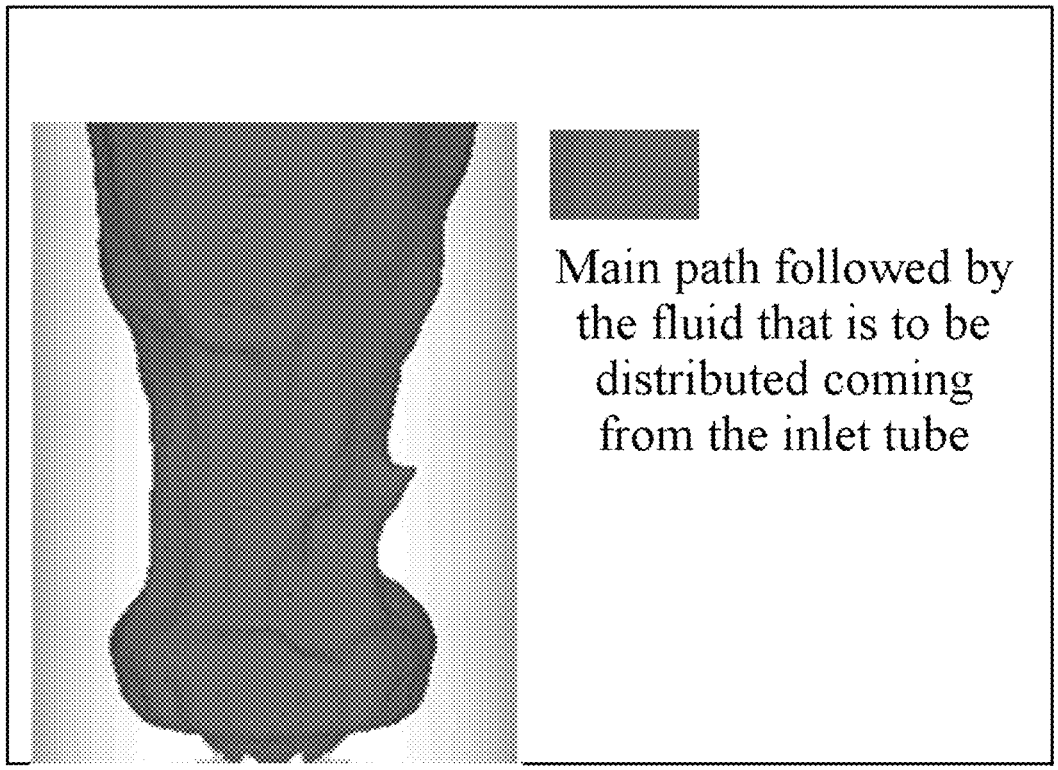
Figure 3: Geometry of the Prior Art

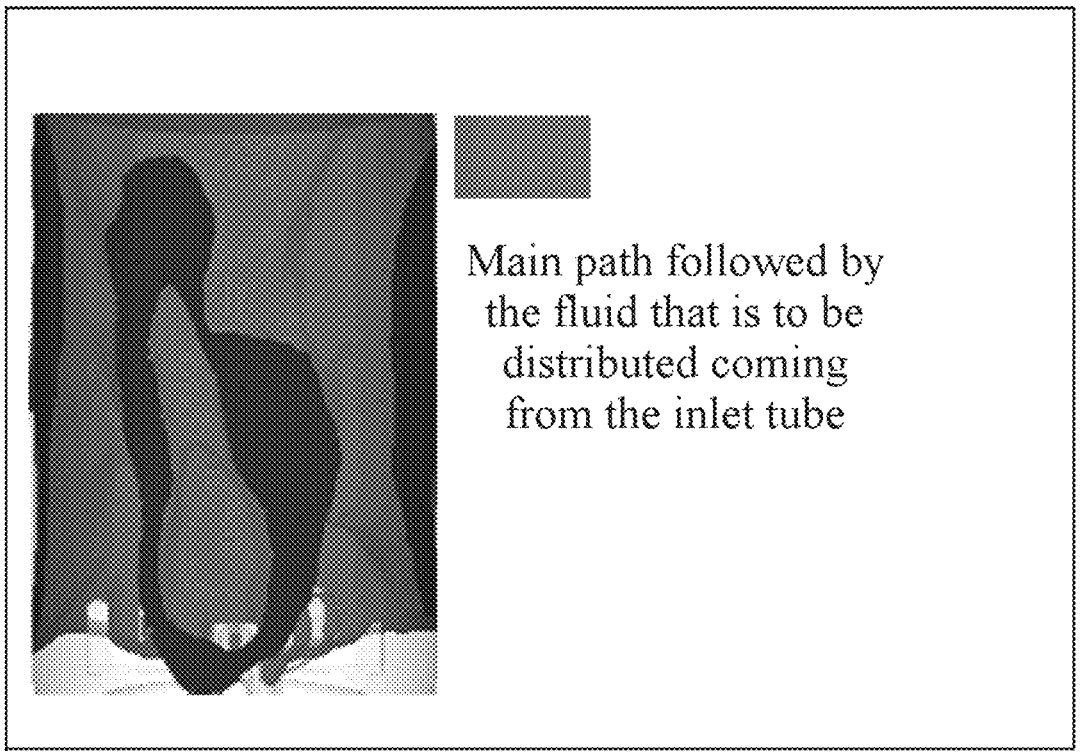
Figure 4: Improved geometry according to the invention

DEVICE FOR DISTRIBUTING A POLYPHASE MIXTURE IN A CHAMBER CONTAINING A FLUIDIZED MEDIUM

CONTEXT OF THE INVENTION

The invention falls within the scope of improving the design of distributors for the distribution of a light phase in a dense phase. In general, the light phase is a gas phase and the dense phase is the liquid phase, but more generally, in the context of fluidized beds, the light phase is a gas phase, gas-solid-phase, or a liquid phase, and the dense phase is the fluidized bed itself, namely the emulsion of solid particles dispersed in the gas or the liquid.

In the case of the reaction chamber being a fluidized bed, which contains a solid phase (which may or may not be catalytic) held in suspension in the pseudo-fluid state by the passage of a gaseous or liquid fluid, a mixture of gaseous and liquid fluids, or a pseudo-fluid consisting of gas or liquid containing particles in suspension, the distribution has the essential role of maintaining the fluidization of the solid in the reactor.

It is therefore vital to ensure good distribution of the fluid phases at their entry into the reactor. Chapter 6 of the work entitled "Handbook of Fluidization and Fluid-Particle Systems" (ed. Yang 2003) gives examples of the various types of distributor used in polyphasic systems.

By way of example, U.S. Pat. No. 4,760,779 reports a holed-plate type distributor used to supply to fluidized beds. Documents U.S. Pat. Nos. 2,841,476 and 3,672,577 give examples of distributors equipped with protective domes mounted over each hole in order to prevent the return of solid and the breakup of the jets.

It is an object of the present invention to describe a system that allows a light fluid phase to be distributed in a reaction chamber containing a fluidized solid or a liquid phase, characterized by a heavier density than the light phase that is to be distributed. This system makes it possible not only to break up the velocity in the vicinity of the introduction of the light phase, but also to distribute the light phase across the entire cross section of the reactor.

More specifically, the system according to the invention is made up of piping that allows the light fluid phase to be carried into the reactor. Deflectors are arranged at the end of this piping, to distribute the lighter fluid phase at various radial positions in the reactor.

The invention is particularly well-suited to the distribution of a light fluid phase (gas or gas/liquid) in a three-phase ebullated fluidized bed reactor in which the catalyst is fluidized by a mixture of reactant fluids made up of a gas and of a liquid.

The invention can be used for distributing the light phase in the liquid upstream of a distributor made up of a perforated-plate system. The invention is particularly well-suited when the light fluid is hydrogen, and when the heavy fluid is a petroleum residue, for implementation in an ebullated-bed hydroconversion reactor consisting of a three-phase fluidized reactor.

The invention is also particularly well-suited to distributing a gas-solid or gas-liquid phase at high temperature in a fluidized bed reactor. That is for example the case of the staged regeneration of catalyst in the R2R process in which the catalyst undergoes a first step of combustion in a fluidized bed reactor, then a second step of regeneration, likewise in a fluidized bed, in which fluidized bed the catalyst needs to be distributed homogeneously over the entire cross section of the second regeneration stage, in order to promote combustion reactions and limit temperature differences.

More generally, the device according to the invention can be used nonlimitingly in the following reactors:
reactors for FCC (fluid catalytic cracking) methods,
reactors for the regeneration of catalysts, for example catalytic cracking catalysts,
reactors comprising a fluidized bed of catalysts,
hydrotreatment or hydrocracking reactors operating in upflow with introduction of a two-phase gas/liquid or gas/solid flow in the bottom of the reactor chamber,
reactors of the "slurry" type,
strippers, dryers, aerators or humidifiers, and
catalytic pyrolysis reactors.

BRIEF DESCRIPTION OF THE FIGURES

FIG. 3 is a visualization, derived from 3-D simulation, that makes it possible to monitor the dispersal of the fluid introduced into the chamber by means of a distributor according to the prior art.

FIG. 4 is a visualization, derived from 3-D simulation, that makes it possible to monitor the dispersal of the fluid introduced into the chamber (5) by means of a distributor according to the present invention.

FIGS. 3 and 4 serve to illustrate the comparative example given at the end of the text.

EXAMINATION OF THE PRIOR ART

Figure 1:
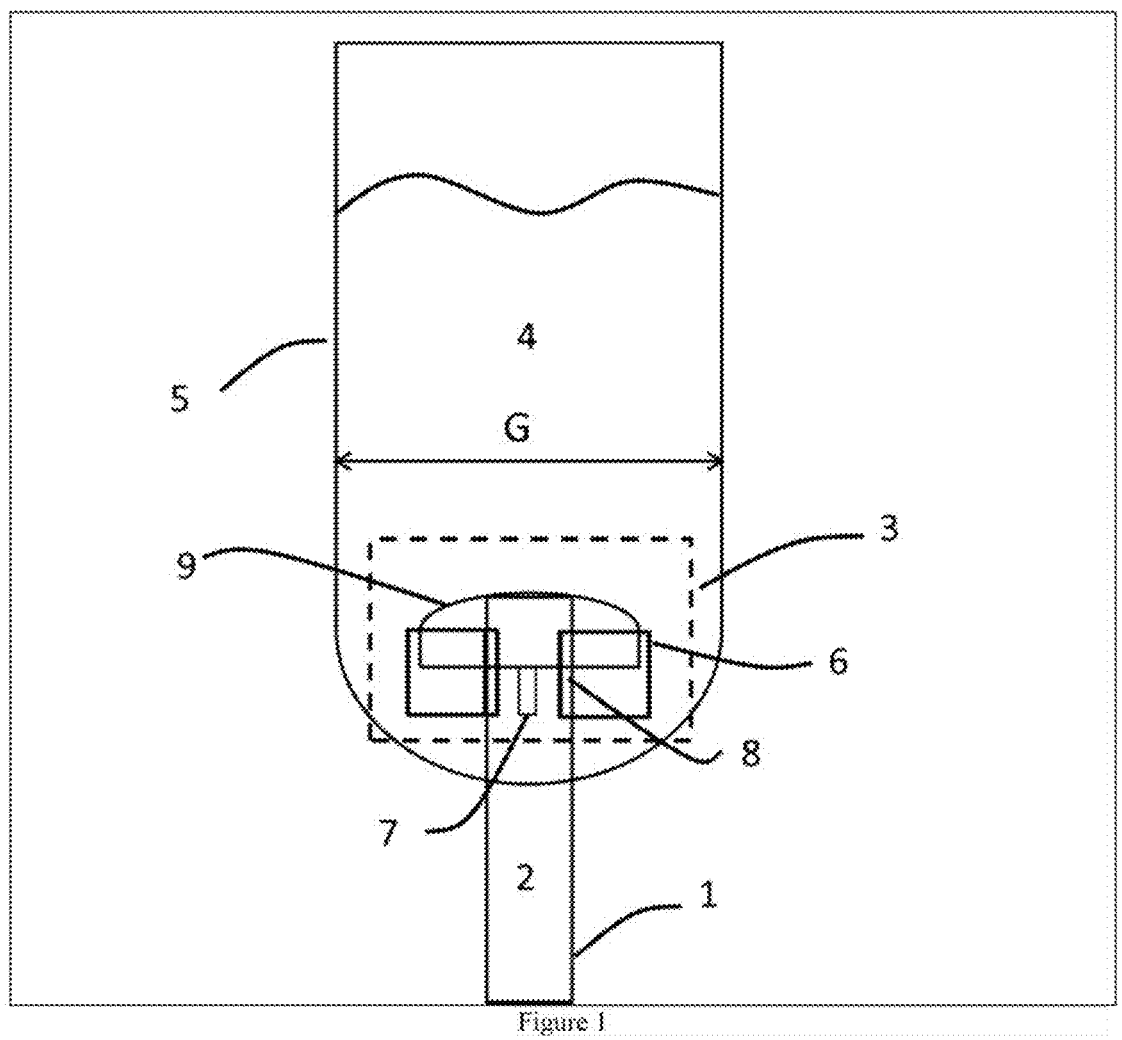
FIG. 1 is a view, in profile, of the polyphasic distribution device according to the invention. The openings (7) and (8), the head (9) and the incoming tube (2) can be discerned therein.

The prior art in the field of distributors in a polyphasic medium is fairly rich and only the closest prior art will be adopted by way of prior art, in the form of the following two documents:

U.S. Pat. No. 5,571,482 describes temperature control in an FCC regenerator using a fluidized bed heat exchange device referred to as a "cat cooler". That patent briefly mentions a distributor of the "mushroom-cap" type at the top of the riser in the regenerator (column 6/line 40) without specifying the dimensions thereof.

Patent FR 3,006,607 describes a distributor of the "mushroom-cap" type, applicable to H-oil and FCC processes. That patent claims a distribution of a light phase in a dense phase (gas in liquid or gas in a fluidized bed), in which once again there is a means of conveying the fluid that is to be introduced, a cap (5) having a main body (6) in the shape of a dome, and a deflection means (14) configured to direct the fluid toward the periphery of the cap (5). The dimensions of the key elements are specified. The device according to the invention significantly improves the distribution of the light phase in the reactor by comparison with the device described in patent FR 3,006,607.

BRIEF DESCRIPTION OF THE INVENTION

The present invention may be defined as a device for distributing a light phase in a heavy phase inside a reaction chamber (5) containing said heavy phase in the fluidized state.

The light phase may be a gas, a gas-solid suspension or a liquid, and the fluidized heavy phase may be a gas-solid emulsion or even a three-phase gas-solid-liquid medium like that encountered in processes for the hydrotreatment of petroleum fractions.

The distribution device according to the invention comprises a pipe (1) for conveying the light phase entering the reaction chamber (5) in its lower part, said pipe (1) being cylindrical and substantially centred along the axis of symmetry of the chamber (5), and being open in its upper part via first and second rectangular openings (7, 8) pierced in the lateral wall of said pipe (1).

The openings (7) open directly into the fluidized medium of the reaction chamber (5), while the second openings (8) are extended by branches (6) perpendicular to the axis of symmetry of the chamber (5) making it possible to reach the periphery of the chamber (5).

The pipe (1) is surmounted at its upper part by a convex head (9) which has notches (10) uniformly distributed all along its lower edge, and allows the passage of the branches (6) which protrude beyond the circumference of said head (9).

The first rectangular openings (7) have a width B and a height J, namely a passage cross section B*J, and the second rectangular openings (8) have a width A and a height K, namely a passage cross section A*K, which are determined in such a way that the velocity v of the light phase as it passes through the first and second openings is comprised between 0.3V and 20V, and preferably comprised between 0.5V and 10V, V denoting the velocity of said light phase in the pipe (1). This velocity V is comprised between 1 m/s and 100 m/s and preferably comprised between 3 m/s and 30 m/s.

The first and second openings (7, 8) are arranged in alternation and preferably in even numbers in total, and the same number.

The diameter I of the head (9) is generally comprised between 0.05 G and 0.95 G, preferably comprised between 0.2 G and 0.8 G, and more preferably still, comprised between 0.25 G and 0.75 G, G denoting the inside diameter of the reaction chamber (5).

The length D of the branches (6), measured from the centre O of the device, which coincides with the axis of symmetry of the reaction chamber (5), as far as their outlet end, is comprised between 0.55 G and 0.48 G, and the height L of the branches (6) at their outlet end is comprised between 1 and 10 K.

The notches (10) are generally of triangular or rectangular shape.

When the notches (10) are rectangular, their width is comprised between 0.01 F and 0.9 F, and their height is comprised between 0.01 F and 0.9 F.

When the notches (10) are triangular, the height of the triangle is comprised between 0.01 F and 0.9 F, and the base of the triangle is comprised between 0.01 F and 0.9 F.

The head (9) is generally provided with orifices (11) over its upper dome, said orifices (11) having a diameter of between 1 and 100 mm, preferably between 10 and 50 mm.

In the context of the process for catalytic cracking with two regeneration stages, the device according to the invention may be used to transfer the catalyst from the first regeneration region to the second, turbulent fluidized bed regeneration region.

In the context of a process for processing biomass, the device according to the invention may be used to introduce a gas phase or a gas-solid suspension into the fluidized medium of the biomass-processing reactor.

In the context of a process for hydrotreating heavy petroleum fractions, the device according to the invention may be used to introduce hydrogen into a fluidized medium containing the catalyst particles and the heavy hydrocarbon phase that is to be processed.

More generally, the distribution device according to the invention may be used in:
  reactors for fluid catalytic cracking (FCC) processes,
  reactors for the regeneration of catalysts, for example catalytic cracking (FCC) catalysts,
  reactors comprising a fluidized bed of catalysts,
  hydrotreatment or hydrocracking reactors operating in upflow with introduction of a two-phase gas/liquid or gas/solid flow in the bottom of the reactor chamber,
  reactors of the "slurry" type,
  strippers, dryers, aerators or humidifiers, and
  catalytic pyrolysis reactors.

DETAILED DESCRIPTION OF THE INVENTION

The present invention relates to a device for the distribution of a single-phase or two-phase fluid in a single-phase or multi-phase fluidized medium of an apparent density higher than that of the fluid that is to be distributed. The light fluid phase can be a gas, or a liquid, or a gas-solid or gas-liquid suspension, or a liquid-solid suspension, characterized in that the density of the suspension is lower than the density in the reaction chamber. The remainder of the text will refer, for short, to a light phase to be distributed.

FIG. 1 below shows the configuration of the device according to the invention. It is a chamber (5) which may, for example, be that of a reactor or of a regenerator equipped with a distribution device.

A tube (1) allows a light fluid phase (2) to be conveyed into a reaction chamber (5) containing a dense fluid phase (4).

The tube (1) is preferably vertical if it is transporting a multi-phase flow.

For preference, the final part of the tube (1) is arranged coaxially with respect to the reaction chamber (5).

Figure 2:
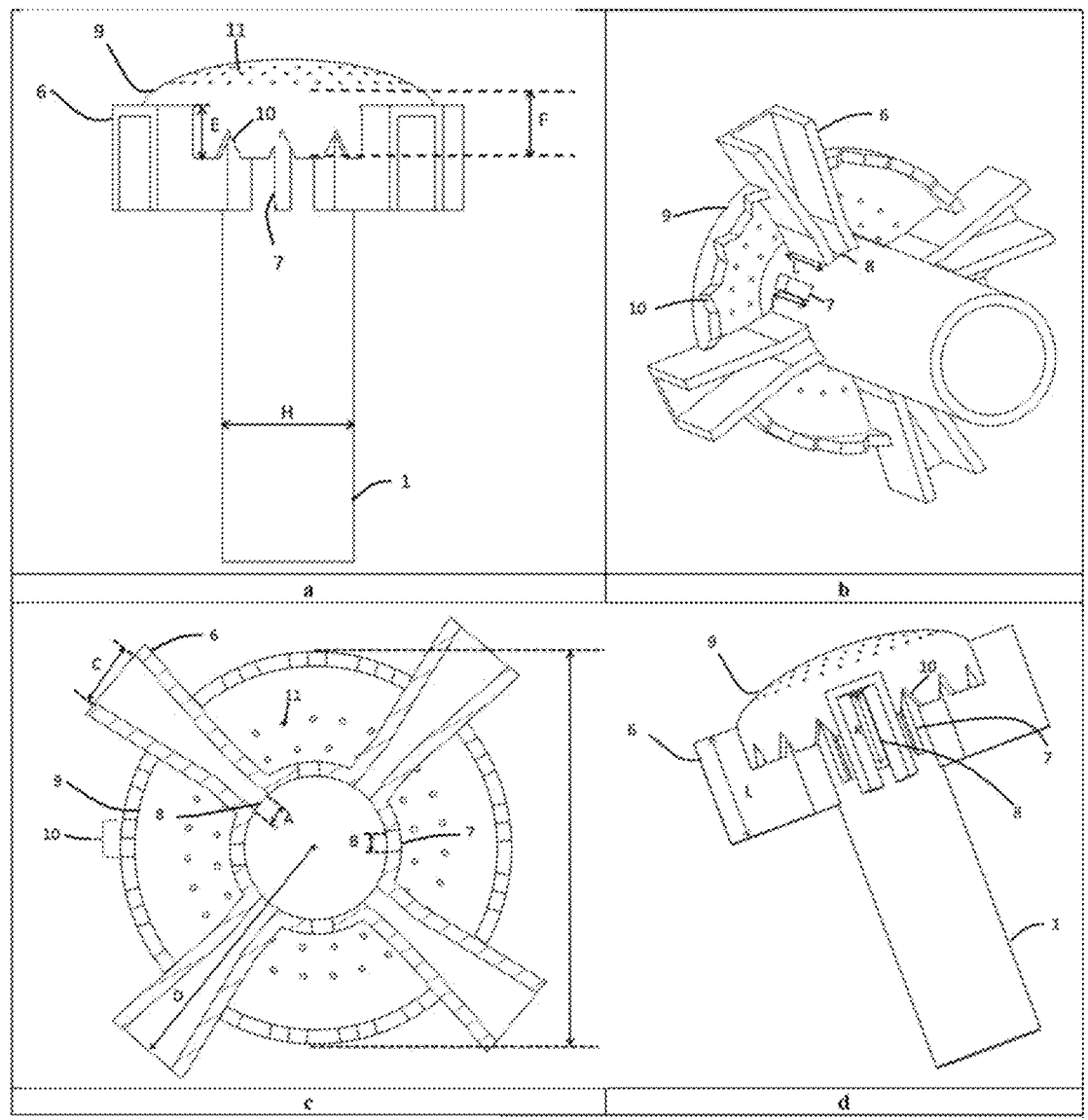
FIG. 2a provides a more detailed view, in profile, of the distributor, in particular showing the dimensions E, F and H.
FIG. 2b is a view, from beneath, of the distributor showing the branches (6) extending from the openings (8), and the notches (10).
FIG. 2c is a view, from beneath, of the distributor according to the invention, providing a better understanding of how the branches (6) are organized and how the openings (7) and (8) alternate. The dimensions A, B, C, D are introduced in this figure.
FIG. 2d is a view, in profile, of the distributor, showing the height K of the openings (8) and the height L of the branches (6).

The fluid (2) is introduced into the chamber (5) by means of a distributor (3) depicted roughly in FIG. 1, and in greater detail in FIG. 2.

The distribution device (3) is placed at the upper end of the pipe (1). The fluid (2) is introduced into the chamber (5) through two types of opening (7) and (8).
  the openings of type (7) have a width B and a height J,
  the openings of type (8) have a width A and a height K,
  The type-(8) openings are connected to branches (6) of length D, the ends of which have a width C.

A splashboard consisting of a domed head (9) is arranged at the top of the piping (1) to better distribute the fluid (2) introduced through the openings (7) into the central part of the chamber (5), by passing through the orifices (11)

arranged in the top of the head (9), or through the notches (10) arranged in the lateral walls of this head.

In order to allow the fluid (2) to reach the peripheral part situated around the head (9), branches (6), the openings of which correspond to the openings (8), convey the fluid passing through the openings (8). These branches (6) distribute the fluid (2) into the annular zone via their outlet ends of width C.

The fluid (2) in the pipe (1) has a velocity denoted V.

In the case of a gas, the velocity V is comprised between 1 and 100 m/s, and for preference comprised between 3 and 30 m/s.

In the case of a gas-solid suspension, the velocity of the gas is comprised between 3 and 30 m/s, and for preference comprised between 6 and 25 m/s and the flow of solids transported is comprised between 5 and 1000 kg/s/m$^2$, preferably comprised between 50 and 600 kg/s/m$^2$ The total number of openings (7) and (8) is preferably an even number and will be comprised between 2 and 48, preferably between 4 and 24, and as a preference, between 8 and 12.

The openings (8) are connected to the branches (6). The number of type-(8) openings may represent between 10% and 80% of the total number of openings, preferably between 40% and 60% of the total number of openings, and, as a preference, 50% of the total number of openings.

The dimensions (B, J) of the type-(7) openings and (A, K) of the type-(8) openings are chosen in order to have a velocity for the fluid (2) in the openings comprised between between 0.3V and 20V, and preferably between 0.5V and 10V, and, for as a preference, equal to V.

For preference, the number of type-(7) openings is equal to the number of type-(8) openings, and the openings alternate uniformly at the periphery of the tube 1.

The dimensions (B, J) of the type-(7) openings may differ from the dimensions (A, K) of the type-(8) openings. The surface areas of the type-(7) openings and of the type-(8) openings are proportional to the desired volumetric distribution of the fluid (2) between these two types of openings. Thus, if the head (9) covers half the passage cross section of the reactor (5), then the flowrate passing through the type-(7) openings supplying the cross section covered by the head (9) will be equal to the flow rate passing through the openings (8) and the branches (6) supplying the peripheral section. With the same number of openings (7) and (8), it is possible to have similar dimensions for the two types of openings.

The diameter I of the head (9) is comprised between 0.05 G and 0.95 G, preferably between 0.2 G and 0.8 G, and more preferably still, between 0.65 G and 0.75 G. The design of the holes (11), of the notches (10) and of the height of the head (9) are as per document FR 3 006 607.

The upper wall of the branches (6) is preferably horizontal. The lower section of the branches (6) is preferably open in order to avoid the phenomenon of saltation in the case of gas/solid flows.

The lateral walls have a height L comprised between 1 and 10 K, preferably between 1 and 7 K and, as a preference, between 1.2 and 3 K.

In order to ensure that the fluid (2) passes mainly through the ends of the branches (6), it is preferable for the kinetic energy needed to pass along the branch to be equal to or less than and the potential energy required in order for the fluid (2) to flow through the lateral walls of the branches:

$$\rho_4 gL \geq \frac{1}{2}\rho_2 v^2 \qquad (a)$$

v being the velocity of the fluid in the opening (8), $\rho_4$ being the density of the dense fluid phase denoted (4), and $\rho_2$ the density of the fluid phase that is to be distributed, denoted (2).

The passage cross section formed by the branch may be constant or variable.

The end of the branches (6) has a width C comprised between 0.1 A and 10 A, preferably between 0.5 A and 7 A and, as a preference, between 1 and 5 A, A being the width at the inlet of the type-(8) openings.

The length E is comprised between 0 and F, preferably between 0.1 and 0.9 F and, as a preference, between 0.2 and 0.7 F, F being the height of the lower part of the head (9).

E being the distance between the upper section of the branches and the base of the notches (10), and F being the height of the lower part of the head (9), namely, more specifically, the height of that part of the head that does not contain perforations such as (11).

The distribution device according to the present invention may be supplemented by a distribution ring situated above or below the distributor (3) to introduce additional gas according to the needs of the process. For preference, said ring, when one exists, is positioned under the lowermost part of the openings (7) and (8) in order to encourage mixing.

Examples According to the Invention

The two examples hereinbelow correspond to one case according to the prior art and one case according to the present invention.

The fluid (2) corresponding to the light phase is distributed into a denser fluidized medium contained in the reaction chamber.

3-D CFD simulations according to the prior art, on the one hand, and according to the invention on the other hand were run and can be visualized by means of FIGS. 3 and 4 respectively.

Table 1 below presents the operating conditions and the dimensions of the distributors according to the prior art and according to the invention. The particular values are those used in the example.

TABLE 1

| dimensions of the device according to the prior art and according to the invention | |
|---|---|
| OPERATING CONDITIONS | |
| Diameter of inlet pipe 1 (m) | 0.1 to 0.3, particularly 2 |
| Diameter of chamber 5 (m) | 1 to 15, particularly 7.5 |
| Density of the fluid 2 to be distributed (kg/m$^3$) | 0.5 to 250, particularly 20 |
| Density of the ambient medium 4 (kg/m$^3$) | 250 to 1000, particularly 500 |
| DIMENSIONS OF A DISTRIBUTOR OF THE PRIOR ART | |
| Diameter of head 9 (m) | 0.7 to 10, particularly 4 |
| Total number of openings | 4 to 12, particularly 8 |
| Number of holes 11 | 100 to 500, particularly 160 |
| Diameter of holes 11 (mm) | 20-100, particularly 60 |
| DIMENSIONS OF A DISTRIBUTOR ACCORDING TO THE INVENTION | |
| Diameter of head 9 (m) | 0.7 to 10, particularly 4 |
| Total number of openings | 4 to 16, particularly 8 |
| Number of branches | 2 to 8, particularly 4 |
| Number of holes 11 | 50 to 250, particularly 80 |
| Diameter of holes 11 (mm) | 20-100, particularly 60 |
| Branch length D (m) | 1.5 to 5, particularly 2 |
| Length A (m) | 0.1 to 0.3, particularly 0.2 |
| Length B (m) | 0.1 to 0.3, particularly 0.2 |

TABLE 1-continued dimensions of the device according to the
prior art and according to the invention

| | |
|---|---|
| Length C (m) | 0.2 to 0.9, particularly 0.6 |
| Length F (m) | 0.2 to 2, particularly 0.6 |
| Length E (m) | 0 to 0.8, particularly 0.6 |
| Length J (m) | 0.7 to 2, particularly 1.3 |
| Length K (m) | 0.7 to 2, particularly 1.3 |
| Length L (m) | 0.7 to 2, particularly 1.5 |

FIGS. 3 and 4 show the path of the light phase that is to be distributed in the higher-density fluid coming from the inlet tube (1), respectively in the case of the device according to the prior art (FIG. 3), and in the case of the device according to the invention (FIG. 4).

With the device according to the invention, the distribution of the gas coming from the inlet tube is better, with the majority of the reaction chamber (5) being covered. The fluid 2 occupies approximately 70% of the volume above the distributor (3), compared to 27% for the device of the prior art.

Thus, the light phase is well dispersed and interacts more effectively with the dense phase, which improves the performance of the reactor compared to the patent of the prior art.

The invention claimed is:

1. The device for distributing a light phase in a heavy phase inside a reaction chamber (5) containing said heavy phase in a fluidized state, the device comprising a pipe (1) for conveying the light phase entering the reaction chamber (5) in its lower part, said pipe (1) being cylindrical and substantially centered along the axis of symmetry of the chamber (5), and being open in its upper part via first and second rectangular openings (7, 8) pierced in the lateral wall of said pipe (1), the second openings (8) being extended by branches (6) perpendicular to the axis of symmetry of the reaction chamber (5), and the pipe (1) being surmounted at its upper part by a convex head (9) which has notches (10) uniformly distributed all along its lower edge, and allows the passage of the branches (6) which protrude beyond the circumference of said head (9).

2. The device for distributing a light phase according to claim 1, in which the first openings (7) have a width B and a height J, and the second openings (8) have a width A and a height K, which are determined in such a way that the velocity of the light phase as it passes through the first and second openings is between 0.3V and 20V, V denoting the velocity of said light phase in the pipe (1).

3. The device for distributing a light phase according to claim 1, in which the length D of the branches (6), measured from the center O of the device, which coincides with the axis of symmetry of the reaction chamber (5), as far as their outlet end, is between 0.6 G and 0.95 G, G denoting the inside diameter of the reaction chamber (5), and the height L of the branches (6) at their outlet end is between 1 and 10 K, K denoting the height of the second openings (8).

4. The device for distributing a light phase according claim 1, in which the first and second openings (7, 8) are arranged in alternation.

5. The device for distributing a light phase according claim 1, in which the diameter I of the head (9) is between 0.05 G and 0.95 G, G denoting the inside diameter of the reaction chamber (5).

6. The device for distributing a light phase according claim 1, in which the notches (10) are of triangular or rectangular shape.

7. The device for distributing a light phase according claim 1, in which when the notches (10) are rectangular, their width is between 0.01 F and 0.9 F, their height is between 0.01 F and 0.9 F, F being the height of the lower part of the head (9).

8. The device for distributing a light phase according claim 1, in which when the notches (10) are triangular, the height of the triangle is between 0.01 F and 0.9 F, and the base of the triangle is between 0.01 F and 0.9 F, F being the height of the lower part of the head (9).

9. The device for distributing a light phase according claim 1, in which the head (9) is provided with orifices (11) over its upper dome, said orifices (11) having a diameter of between 1 and 100 mm.

10. A process for catalytic cracking with two regeneration regions, comprising transferring a catalyst from a first regeneration region to a second, turbulent fluidized bed regeneration region by the device according to claim 1.

11. A process for processing biomass, comprising introducing a gas phase, or a gas-solid suspension, into a fluidized medium by the device according to claim 1.

12. A process for the hydrotreatment of heavy petroleum fractions, comprising introducing hydrogen into a fluidized medium containing catalyst particles and the heavy hydrocarbon phase that is to be processed by the device according to claim 1.

13. The device for distributing a light phase according to claim 1, in which the first openings (7) have a width B and a height J, and the second openings (8) have a width A and a height K, which are determined in such a way that the velocity of the light phase as it passes through the first and second openings is between 0.5V and 10V, V denoting the velocity of said light phase in the pipe (1).

14. The device for distributing a light phase according claim 1, in which the first and second openings (7, 8) are arranged in alternation and in even numbers in total.

15. The device for distributing a light phase according claim 1, in which the first and second openings (7, 8) are arranged in alternation and in the same number.

16. The device for distributing a light phase according claim 1, in which the diameter I of the head (9) is between 0.2 G and 0.8 G, G denoting the inside diameter of the reaction chamber (5).

17. The device for distributing a light phase according claim 1, in which the diameter I of the head (9) is between 0.25 G and 0.75 G, G denoting the inside diameter of the reaction chamber (5).

18. The device for distributing a light phase according claim 1, in which the head (9) is provided with orifices (11) over its upper dome, said orifices (11) having a diameter of between 10 and 50 mm.

* * * * *